No. 853,306. PATENTED MAY 14, 1907.
A. C. KENT.
POTATO EYE REMOVER.
APPLICATION FILED NOV. 23, 1904.
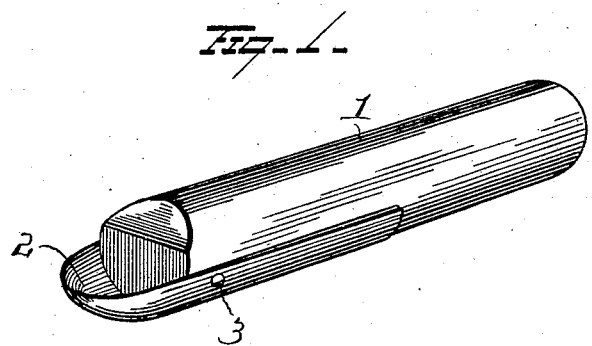
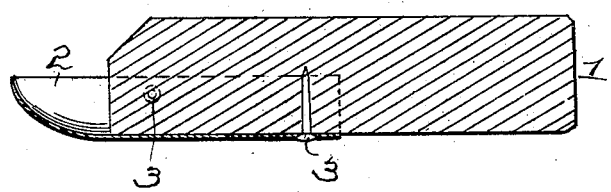
WITNESSES
INVENTOR

UNITED STATES PATENT OFFICE.

ARTHUR C. KENT, OF JANESVILLE, WISCONSIN, ASSIGNOR TO H. M. KENT, OF JANESVILLE, WISCONSIN.

POTATO-EYE REMOVER.

No. 853,306. Specification of Letters Patent. Patented May 14, 1907.

Application filed November 23, 1904. Serial No. 234,048.

*To all whom it may concern:*

Be it known that I, ARTHUR C. KENT, a resident of Janesville, in the county of Rock and State of Wisconsin, have invented certain new and useful Improvements in Potato-Eye Removers; and I do hereby declare the following to be a full, clear, and exact description of the invention, such as will enable others skilled in the art to which it appertains to make and use the same.

My invention relates to an improved potato eye remover, the object of the invention being to provide a device of simple inexpensive construction, which will with but slight movement and easy operation, remove the eyes of potatoes and remove pieces of uniform size and shape, which is especially desirable when used in planters, and the invention consists in certain novel features of construction and combinations and arrangements of parts as will be more fully hereinafter described and pointed out in the claims.

In the accompanying drawings Figure 1 is a perspective view, illustrating my improvements, and Fig. 2 is a view in longitudinal section.

1 represents a handle, which may be of wood, or other material and of any shape desired, save that it should have a flat or straight end, and the handle shown at one end, is beveled to permit the ready operation of the device, as will more fully hereinafter appear. To the handle a cutter 2 is secured and comprises a strip of sheet metal, dished as shown and secured to the handle by tacks 3, or in any desired manner. The end of the cutter 2, which projects out beyond the handle, is of the shape of approximately one fourth an ellipse and the edges thereof may be sharpened to facilitate its operation.

In operation, a potato is held in one hand, and the handle 1 grasped in the other. Cutter 2 is then forced into the potato at one side of the eye, and when it is in the potato with the flat end of the handle against the potato, the handle is given a half turn, to compel the cutter to remove an approximately semi-elliptical section of the potato with the eye therein, and as above stated, the end of the handle, is beveled or cut away to facilitate its manipulation in forcing the cutter into the potato.

My improved device enables sections of potato, containing the eye, and of exactly the same size and shape to be removed, which is very essential when employing a planter. The device is of extremely simple construction, cheap to manufacture, and can be quickly operated by any one.

Slight changes might be made in the general form and arrangement of the parts described without departing from my invention and hence, I would have it understood that I do not restrict myself to the precise details set forth but consider myself at liberty to make such slight changes and alterations as fairly fall within the spirit and scope of my invention.

Having fully described my invention, what I claim as new and desire to secure by Letters-Patent is:—

1. A device for removing eyes from potatoes, comprising a handle, a dished cutter partially embracing said handle and projecting from one end thereof, the protruding end of said cutter having such shape that it will, together with the end of the handle mark approximately one-fourth of an ellipse, said end of the handle constituting a limiting abutment behind the protruding portion of the dished cutter.

2. A device for removing eyes from potatoes, comprising a handle and a curved cutter plate partially embracing the handle and projecting from one end thereof, the projecting portion of the cutter plate having such shape that it will, together with the end of the handle, mark approximating one-fourth of an ellipse, and the end of the handle over the cutter beveled.

In testimony whereof, I have signed this specification in the presence of two subscribing witnesses.

ARTHUR C. KENT.

Witnesses:
C. P. BURR,
SILAS HAYNER.